(12) United States Patent
Richter

(10) Patent No.: US 6,751,010 B1
(45) Date of Patent: Jun. 15, 2004

(54) LOW FINESSE, TRI-ETALON, OPTICAL PARAMETRIC OSCILLATOR

(75) Inventor: Dale A. Richter, Sandia Park, NM (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/420,731

(22) Filed: Apr. 23, 2003

(51) Int. Cl.[7] ................................................ G02F 1/39
(52) U.S. Cl. ...................................................... 359/330
(58) Field of Search ................. 359/326–330; 372/21–22

(56) References Cited

U.S. PATENT DOCUMENTS

| | | | |
|---|---|---|---|
| 3,609,389 A | * 9/1971 | Bjorkholm | 359/330 |
| 3,628,186 A | 12/1971 | Ashkin et al. | 331/107 R |
| 4,180,751 A | * 12/1979 | Ammann | 359/330 |
| 4,189,652 A | * 2/1980 | Levinos et al. | 359/330 |
| 5,047,668 A | 9/1991 | Bosenberg | 359/330 |
| 5,079,445 A | 1/1992 | Guyer | 359/330 |
| 5,134,622 A | 7/1992 | Deacon | 372/21 |
| 5,297,156 A | * 3/1994 | Deacon | 372/21 |
| 5,371,752 A | 12/1994 | Powers et al. | 372/25 |
| 5,805,626 A | * 9/1998 | Komatsu et al. | 372/41 |
| 5,841,570 A | 11/1998 | Velsko | 359/330 |
| 5,999,547 A | 12/1999 | Schneider et al. | 372/21 |
| 6,044,094 A | 3/2000 | Govorkov | 372/21 |
| 6,101,023 A | 8/2000 | Meyer, Jr. et al. | 359/330 |
| 6,167,067 A | 12/2000 | Meyer, Jr. et al. | 372/21 |
| 6,215,800 B1 | 4/2001 | Komine | 372/22 |
| 6,295,160 B1 | 9/2001 | Zhang et al. | 359/330 |
| 6,433,918 B1 | * 8/2002 | Kasai et al. | 359/330 |

* cited by examiner

Primary Examiner—John D. Lee
(74) Attorney, Agent, or Firm—Edell, Shapiro & Finnan, LLC

(57) ABSTRACT

A low-finesse, tri-etalon optical parametric oscillator includes an optical cavity bounded by two coupling mirrors, and a narrow-linewidth pump laser which supplies pump energy to the optical cavity at a pump wavelength. A pair of walk-off compensated, non-linear optical crystals (but not limited to walk-off compensated) is disposed with the cavity and converts energy at the pump wavelength to energy at longer signal and idler wavelengths. The mirrors are configured such that each of the three beams (pump, signal and idler) is approximately 70% to 100% reflected at one end of the cavity and approximately 10% to 30% reflected at the other end of the cavity. This configuration causes partial resonance of each of the beams and generates an etalon effect which enhances the fluence in the leading and trailing edges of pulses in the cavity, thereby enhancing the energy conversion efficiency from the pump wavelength to the signal and idler wavelengths.

37 Claims, 2 Drawing Sheets

LOW FINESSE, TRI-ETALON, OPTICAL PARAMETRIC OSCILLATOR

BACKGROUND OF THE INVENTION

1. Field of the Invention

The present invention relates to a high-efficiency optical parametric oscillator and, more particularly, to a tri-etalon optical parametric oscillator having a low reflectivity mirror set providing a low-finesse etalon effect for the pump, signal and idler beams which enhances the energy conversion efficiency.

2. Description of the Related Art

Optical parametric oscillators are well-known, non-linear optical devices capable of producing coherent radiation at a desired frequency via parametric amplification. In a conventional optical parametric oscillator (OPO), a pump source supplies a beam of laser light at a pump wavelength to an optical cavity bounded by end mirrors and containing a non-linear optical medium such as a non-linear optical crystal. As the pump beam propagates through the non-linear crystal within the cavity, photons at the pump wavelength are converted into photon pairs at two longer wavelengths, resulting in two lower-energy beams at these two wavelengths, conventionally denoted as the signal wavelength and the idler wavelength. The sum of the frequencies of the signal and idler beams equals the frequency of the pump beam. The particular wavelengths of the signal and idler beams are determined by a number of factors, including: the pump wavelength, the type and structure of the non-linear crystal, and the design of the optical cavity. By tuning the angle of the non-linear crystal, the energy can be selectively apportioned between the signal and idler beams.

Since typical operating conditions cause only a small fraction of the pump beam to be converted to the signal and idler beams in the initial pass through the non-linear optical crystal, the optical cavity of the OPO is generally designed to oscillate one or both of the parametrically generated beams such that the signal and/or idler beam is amplified in successive passes through the non-linear optical crystal. The OPO is considered a doubly resonant oscillator when both of the generated optical beams are resonated and is considered a singly resonant oscillator when only one of the generated optical beams is resonated. Specifically, the optical cavity can be designed with end mirrors which reflect only one of the signal and idler frequencies (singly resonant) or with end mirrors which reflect both the signal and idler frequencies (doubly resonant).

Normally, the signal beam, the idler beam, or both of the beams are resonated in the OPO cavity with reflectivity greater than 60% on one end mirror and greater than 99% on the other end mirror for the resonated wavelengths. Typically, for high power OPO cavities, the pump beam is not resonated due to damage limitations in the optical coating of the mirrors. To narrow the standard OPO device in wavelength, an additional element is usually incorporated into the cavity, or an external seed source is introduced into the cavity. The output is taken from the end mirror that has the lesser reflectivity, and the pump beam is either single passed or double passed through the cavity. As the fluence is increased, at some point the energy conversion process begins to operate in reverse, with signal and idler energy converting back to the pump wavelength. This undesirable back conversion self-limits the efficiency of the OPO device. Energy conversion efficiencies from the pump frequency to the signal or idler frequencies typically do not exceed a maximum of 35 to 40% in such conventional OPOs.

Moreover, OPOs are generally designed either for narrow linewidth or high energy, but not both. To extract a significant amount of energy from a standard OPO, the linewidth will broaden as the pump energy level is increased. Additionally, to achieve a high level of conversion efficiency, a standard OPO's line narrowing elements cannot handle the intercavity fluence required without suffering damage. Seeding an OPO with a narrow linewidth diode laser can achieve modest conversion efficiency with a narrow linewidth, but the cost and complexity of this approach are great. Additionally, the diode laser has a limited tuning range of only a few nanometers, drastically restricting the signal and idler wavelengths achievable with the OPO device.

Accordingly, there remains a need for a tunable optical parametric oscillator having enhanced energy conversion efficiency, preferably to both the signal and idler frequencies, along with a spectrally narrow laser output and minimal beam divergence.

SUMMARY OF THE INVENTION

Therefore, in light of the above, and for other reasons that become apparent when the invention is fully described, an object of the present invention is to efficiently convert energy in an optical parametric oscillator from a pump wavelength to at least one other wavelength.

A further object of the present invention is to develop an optical parametric oscillator having a low-finesse configuration for all three of the pump, signal and idler wavelength beams.

Yet a further object of the present invention is to design an optical parametric oscillator with a narrow spectral linewidth.

A still further object of the present invention is to provide an optical parametric oscillator with high energy.

Another object of the present invention is to achieve both a narrow linewidth and high energy output in an optical parametric oscillator.

Yet another object of the present invention is to construct an optical parametric oscillator which is low-resonant for the signal, idler and pump beams and behaves as an etalon for all three beams.

Still another object of the present invention is to design an optical parametric oscillator whose signal and idler outputs are tunable over a wide range of wavelengths.

It is a further object of the present invention to enhance energy conversion efficiency by increasing fluence in leading and trailing edges of the laser pulses via partial resonance, while limiting enhancement of the intra-cavity pump fluence during the peak of pulses to prevent excessive back conversion to the pump wavelength.

It is yet a further object of the present invention to compensate for walk off of optical beams caused by interaction with the non-linear medium within the optical cavity of an optical parametric oscillator.

The aforesaid objects are achieved individually and in combination, and it is not intended that the present invention be construed as requiring two or more of the objects to be combined unless expressly required by the claims attached hereto.

The optical parametric oscillator (OPO) of the present invention combines a partially-resonant mirror set (i.e., a low-finesse configuration for all three of the pump, signal and idler wavelength beams) to enhance the energy conversion efficiency, spectrally narrow the laser output, and decrease the output beam divergence by allowing a longer cavity length, thereby reducing the aspect ratio of the beam diameter to cavity length.

The low-finesse OPO includes an optical cavity bounded by two coupling mirrors, and a pump laser which supplies pump energy to the optical cavity at a pump wavelength. Preferably, the pump laser is a narrow-linewidth pump-laser source, such as an injection seeded Nd: YAG laser. A pair of walk-off compensated, non-linear optical crystals is disposed with the cavity and converts energy at the pump wavelength to energy at longer signal and idler wavelengths. The mirrors are configured such that each of the three beams (pump, signal and idler) is fed back into the cavity at a low percentage of approximately 10% to 30%. The result is a partial resonance of each of the beams, which creates an etalon effect that enhances the fluence in the leading and trailing edge of the pulse, thereby enhancing the energy conversion efficiency to the signal and idler wavelengths. During the peak of the pulse, more of the pump beam is converted to the signal and idler photons, and the enhancement of the intra-cavity pump fluence is reduced, thus preventing excessive back conversion of the two parametric wavelengths to the pump wavelength. The output signal energy emerges from one of the coupling mirrors, while the output idler energy emerges from the other coupling mirror.

Tuning of the OPO is limited only by the range over which the dichroic mirrors have uniform response (upwards of 100 nm or more), permitting a wide range of output wavelengths that can be generated. The linewidth of the output is self-narrowed, the exact value of which depends upon the values that make up the separate etalons at each wavelength. Due to the unique low-finesse, tri-etalon configuration of the OPO, the cavity length can be nearly doubled while still maintaining 90% to 95% of the output energy produced at a more conventional, shorter cavity length, giving rise to a higher beam quality (i.e., less beam divergence) without substantial loss of output energy.

In an exemplary embodiment, an input coupling mirror receives and transmits into the optical cavity between approximately 70% to 90% of the pump energy generated by the pump laser. The incident pump beam travels through the non-linear optical crystals, causing conversion of some pump energy to the signal and idler wavelengths. An output coupling mirror then reflects between approximately 70% to 100% of the pump energy back through the cavity and the non-linear crystals before 70% to 90% of the pump energy is transmitted out of the optical cavity through the input coupling mirror. The input coupling mirror reflects between approximately 70% to 100% of the energy at the signal wavelength and transmits between approximately 70% to 90% of the energy at the idler wavelength, while the output coupling mirror reflects between approximately 70% to 100% of the energy at the idler wavelength and transmits between approximately 70% to 90% of the energy at the signal wavelength.

The cavity length,is adjustable to maintain resonance of all three waves (i.e., pump, signal and idler). To maintain efficient energy conversion, a closed-loop servo system or the like evaluates the power of the output beam or a reduction of power in the rejected pump and adjusts the cavity length accordingly using a piezoelectric element or other known mechanism.

The above and still further objects, features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DESCRIPTION OF THE PREFERRED EMBODIMENTS

Figure 1:
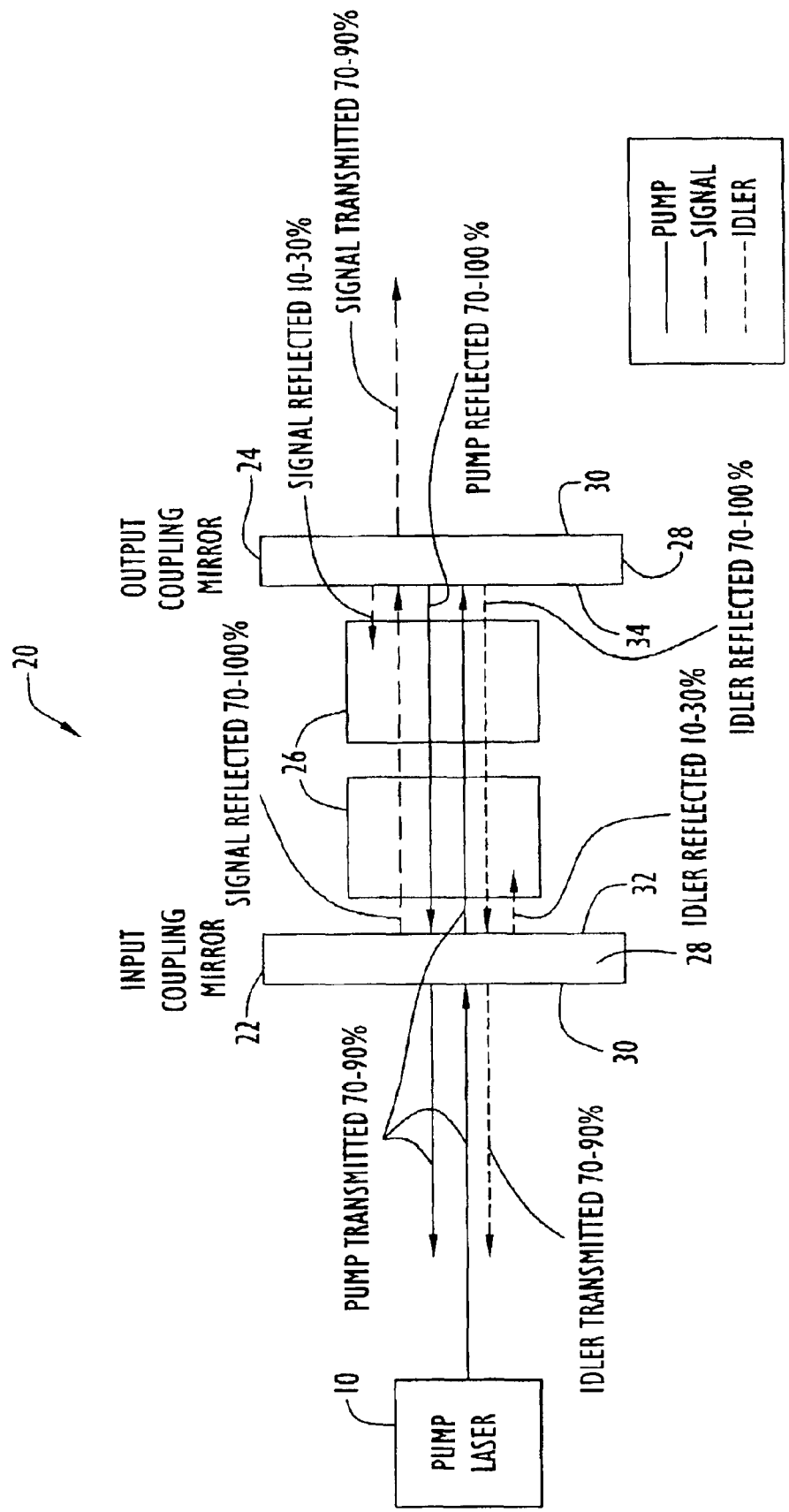
FIG. 1 is a diagram illustrating a low-finesse, tri-etalon optical parametric oscillator in accordance with an exemplary embodiment of the present invention.
Figure 2:
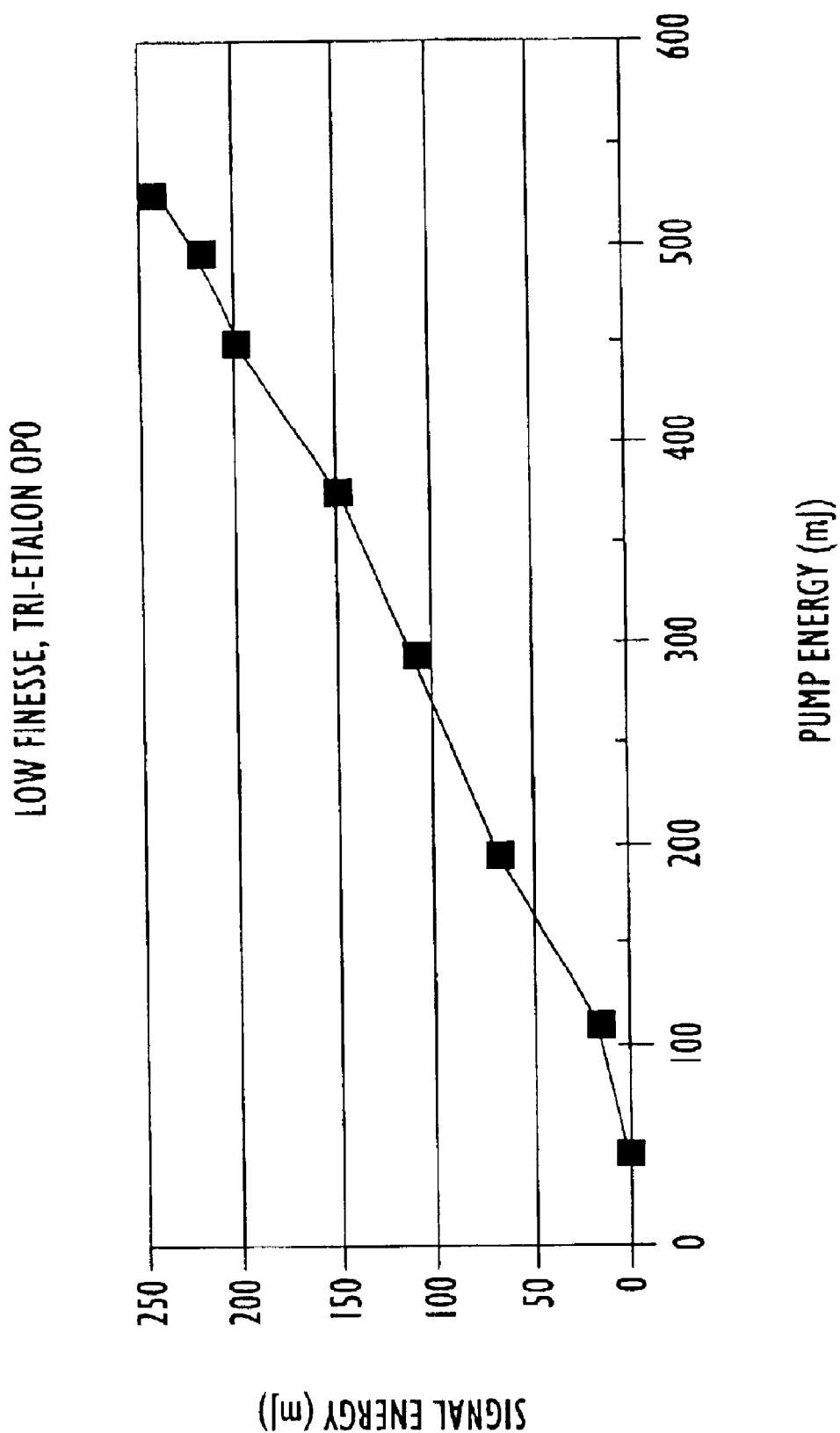
FIG. 2 is a graph illustrating the energy conversion efficiency (from the pump to the signal wavelength) of an optical parametric oscillator constructed in accordance with the exemplary embodiment of the present invention.

The following detailed explanations of FIGS. 1 and 2 and of the preferred embodiments reveal the methods and apparatus of the present invention. The optical parametric oscillator (OPO) of the present invention can be characterized as a low-finesse, tri-etalon OPO and includes two, walk-off compensated, non-linear crystals disposed in a cavity between two coated dichroic mirrors. The mirrors form what can be considered a "low-resonant" or "partially-resonant" mirror set which provides a low-finesse configuration for all three of the pump, signal and idler beams to enhance the energy conversion efficiency, spectrally narrows the laser output, and decreases the output beam divergence by allowing a longer cavity length, thereby reducing the aspect ratio of the beam diameter to cavity length.

The mirrors are configured such that each of the three waves (pump, signal and idler) is fed back into the cavity at a low percentage of between approximately 10% to 30% and on the opposing end of the cavity a high feedback of between approximately 70% to 100% in used. However, when all three beams are only partially resonated, the fluence in the leading and trailing edge of the pulse (in time) is enhanced by the etalon effect, and in turn, the conversion efficiency to the signal or idler is enhanced. During the peak of the pulse, more of the pump beam is converted to the signal and idler photons, and the enhancement of the intra-cavity pump fluence is reduced, thus preventing excessive back conversion of the two parametric wavelengths to the pump wavelength.

A low-finesse, tri-etalon OPO in accordance with an exemplary embodiment of the present invention is shown in FIG. 1. A pump laser 10 supplies pulses of coherent light at a pump frequency to an OPO optical cavity 20 comprising an input coupling dichroic mirror 22, an output coupling dichroic mirror 24, and a non-linear optical medium 26, such as a pair of walk-off compensated non-linear optical crystals. As shown in FIG. 1, optical cavity 20 has a linear cavity design with air gaps between the non-linear crystals and the end mirrors 22 and 24.

Input and output coupling mirrors 22 and 24 each include an optical quality mirror substrate 28 substantially free from internal optical defects and inclusions. Preferably, the optic is wedged in each case to prevent unwanted feedback into the cavity. An anti-reflection coating 30 is deposited on the surfaces of input and output mirrors 22 and 24 external to the cavity to prevent additional feedback from entering the cavity by minimizing the amount of light lost at the interface. The anti-reflection coatings 30 also maximize the output efficiency of the device.

The surface of input mirror 22 which lies in the interior of cavity 20 is coated with a dichroic mirror coating 32 which allows transmission of between approximately 70% to 90% of the energy at the pump wavelength into cavity (i.e., mirror 22 reflects between approximately 10% to 30% of the pump energy). Input mirror coating 32 allows the OPO idler wavelength to escape the cavity with approximately 70% to 90% efficiency (i.e., transmitting between approximately 70% to 90% and reflecting between approximately 10% to 30% of the idler energy), while reflecting between approximately 70% to 100% of the OPO signal wavelength (i.e., transmitting approximately 0 to 30% of the signal energy).

A dichroic mirror coating 34 is also formed on the surface of output mirror 24 interior to cavity 20. Output mirror coating 34 reflects energy at the pump wavelength back into the cavity with between approximately 70% to 100% reflection (i.e., transmits between approximately 0% to 30% of the pump energy), allows OPO signal wavelength to escape with between approximately 70% to 90% efficiency (i.e., transmits between approximately 70% to 90% and reflects between approximately 10% to 30% of the signal energy), and reflects between approximately 70% to 100% of the energy at the OPO idler wavelength (i.e., transmits between approximately 0% to 30% of the idler energy).

Non-linear medium 26 comprises two walk-off compensated non-linear optical crystals spaced apart from end mirrors 22 and 24 via air gaps; however, this device is not limited to walk-off compensated crystals only. The non-linear optical crystals can be formed of any crystalline material capable of producing parametric output, including, but not limited to: potassium tetanal phosphate (KTP), potassium tetanal arsenate (ETA), lithium niobate LiNbO$_3$), periodically poled lithium niobate (PPLN), potassium niobate (KNbO$_3$), silver allium selenite (AgGaSe$_2$), and silver gallium sulfide (AgGaS$_2$). The non-linear optical crystals convert the pump laser wavelength to the signal and idler wavelength. As the pump beam propagates through the non-linear crystal, there exists a phase matching angle. Once phase matching has been achieved, the flow of energy in the generated signal and idler beams is not precisely along the same line as the pump beam. Depending on the type of non-linear crystal material and the cut of the crystal, a small angular deviation in the signal and idler beams occurs. The walk-off compensation corrects these deviations. By introducing a second substantially identical non-linear crystal that is oriented in complementary manner to the first non-linear crystal (i.e., flipped around in an opposite orientation), the second non-linear crystal effectively collapses the deviated input angles of the beams back down onto the same path, thereby correcting for the angular deviation. Walk-off compensation facilitates higher gain and better beam quality in the OPO device.

The reflectances/transmittances of the input and output mirror coatings are integral to the tri-etalon configuration of the OPO of the present invention. Referring again to FIG. 1, pump laser 10 end pumps linear cavity 20 via input coupling mirror 22. Approximately 70% to 90% of the pump energy is transmitted through mirror 22 into cavity 20. The incident pump beam interacts with non-linear crystals 26 to parametrically generate signal and idler beams. Approximately 70% to 100% of the unconverted pump beam is reflected off the output coupling mirror 24 and travels back through non-linear crystals 26, again causing conversion of some of the pump energy into the signal and idler beams. Approximately 70% to 90% of the backward-traveling unconverted pump beam is then transmitted through the input coupling mirror 22 and out of the cavity, while the remaining 10% to 30% is reflected back into the cavity for further interaction, thus causing the build up of photons in the etalon cavity.

When a parametrically generated signal beam traveling in the forward direction (toward output coupling mirror 24) encounters output coupling mirror 24, approximately 70% to 90% of the signal energy is transmitted out of the cavity and serves as an output at the signal wavelength, while 10% to 30% of the signal energy is reflected back into the cavity for further interaction. When the signal beam traveling in the backward direction encounters the input coupling mirror 22, approximately 70% to 100% of the signal energy is reflected back into the cavity for further interaction, thus also causing the build up of photons in the etalon cavity.

When a parametrically generated idler beam traveling in the backward direction (toward input coupling mirror 22) encounters input coupling mirror 22, approximately 70% to 90% of the idler energy is transmitted out of the cavity and serves as an output at the idler wavelength, while 10% to 30% of the idler energy is reflected back into the cavity for further interaction. When the idler beam traveling in the forward direction encounters the output coupling mirror 24, approximately 70% to 100% of the idler energy is reflected back into the cavity for further interaction. Because the configuration of the OPO of the present invention can efficiently convert energy to both the signal and idler wavelength beams, either or both of the signal and idler beams transmitted out of the optical cavity can serve as a useful output signal. Although not shown in FIG. 1, the output signal and idler beams can be received and further processed by any of a variety of optical devices depending upon the particular application or end use of these parametrically generated laser beams.

The optical cavity shown in FIG. 1 might be characterized as "non-resonant" as compared to conventional resonant OPO cavities which typically employ greater mirror reflectances and keep a much higher proportion of the beam energy within the cavity. However, the optical cavity of the OPO of the present invention is not truly non-resonant. Despite the lower mirror reflectances, the optical cavity of the present invention is still partially resonant, because some degree of signal and idler energy is reflected back into the cavity, and this energy causes a handing-off effect inside of the cavity. Consider, for example, that the pump beam enters the cavity through the input coupling mirror and generates both signal and idler beams upon interacting with the non-linear crystals. Most of the signal energy is transmitted through the output coupling mirror, but the idler beam is largely reflected backward into the cavity. This reflected idler beam travels back through the non-linear crystals and generates additional energy at the signal wavelength. After interacting with the non-linear crystals, the backward-traveling idler beam is largely transmitted through the input coupling mirror, while most of the newly generated signal beam is reflected off the input coupling mirror and travels through the cavity again before passing through the output coupling mirror. In effect, both the signal and idler beams are handing off, back and forth in both directions, while the pump beam locks the beams in phase within the cavity. Thus, the optical cavity still exhibits a resonant mode structure and is not truly non-resonant. As used herein, the terms "low-resonant", "partially-resonant", "partially resonate" and the like refer to a property of an optical cavity in which one end mirror reflects between approximately 10% to 30% of the energy at a particular wavelength and the other and mirror reflects between approximately 70% to 100% of the energy at that wavelength, The embodiment shown in FIG. 1 is partially resonant for energy at all three of the pump, signal and idler wavelengths.

While exhibiting a resonant mode structure, the optical cavity of the present invention is nevertheless not "resonant" in the conventional sense typically associated with OPO optical cavities. In a conventional resonant optical cavity which, for example, is resonant for the signal beam, one end mirror reflects nearly 100% of the signal energy while the other end mirror reflects on the order of 60% of the signal energy (and serves as a partial output coupler of about 40% of the signal energy), thereby resulting in a high-finesse cavity which permits considerable build up of signal energy. As previously explained, while a highly-resonant design may provide extremely high gain, the energy conversion efficiency from the pump wavelength to the signal or idler wavelength is limited.

Typically, lowering the reflectivity of one or both of the mirrors of a resonant OPO tends to result in a very inefficient system; thus, low reflectivity is generally considered undesirable for efficient OPO operation. In contrast to conventional approaches, however, the optical parametric oscillator design of the invention achieves improved energy conversion efficiency with much lower mirror reflectivities. A distinctive aspect of the OPO design is that the optical cavity behaves as an etalon with respect to all three waves (pump, signal and idler), increasing the fluence of all three waves on the leading and trailing edges of the pulses. Unlike the lesser-reflective mirror of a resonant optical cavity, which reflect about 60% of the energy, the partial reflector of the etalon-like cavity reflects between approximately 10% to 30% of the energy, creating a low-finesse etalon which helps provide the conversion efficiency on the leading and trailing pulse edges in time. Finesse is generally defined as the ratio of the separation of adjacent fringe-order maxima to the half-width of the maxima. Finesse reflects the transmission bandwidth and is a function of reflectivity, with increased reflectivity resulting in an increase in finesse.

The energy conversion enhancement that results from the etalon-like behavior of the optical cavity with respect to all three wavelengths can be understood by considering the nature of the light pulses within the optical cavity. The light pulses entering the OPO cavity typically have a Gaussian shape both in time and space, with the energy concentrated in the center of the pulse and rolling off toward the edges in a Gaussian manner, resulting in a somewhat football-shaped pulse profile. Conventional OPO's operate most efficiently by converting the center of the pulse, but are generally less proficient at converting the energy contained in the pulse edges. The etalon effect improves the conversion efficiency in the leading and trailing edges of the pulses, thereby enhancing overall conversion efficiency.

As the reflectivity on the etalon is increased, the intra-cavity fluence is increased so that incident light bounces back and forth in the cavity and, when in resonance, the light emerges from the other side of the cavity. Consequently, an increase in the fluence in the cavity results. By putting non-linear crystals inside a cavity that is an etalon, the initial build up of fluence is self-limited. Specifically, because the cavity is enhanced with an etalon effect, a higher than normal fluence exists in the cavity due to the conversion of more of the energy in the leading and trailing pulse edges in time. Near the center of the pulse, the self-limiting nature of the crystals limits the energy conversion and minimizes back conversion. The net effect is that fluence in the cavity is enhanced and energy conversion at the center of the pulse is comparable to that in a conventional OPO, while the energy conversion is drawn up in the leading and trailing edges of the pulse, resulting in more energy being converted overall.

In the embodiment described, the enhancement from the etalon effect is experienced at all three of the pump, signal and idler wavelengths, giving rise to the term "tri-etalon". This enhancement is due to the relatively small amount of reflectivity on both ends for the three wavelengths (i.e., approximately 10% to 30% on one end and approximately 70% to 100% on the other end). This configuration effectively creates a lower-finesse etalon for all three wavelengths, resulting in the substantial enhancement in the efficiency of the device.

Preferably, the OPO of the present invention employs a narrow-linewidth pump-laser source, such as an injection seeded Nd: YAG laser. An unseeded Nd: YAG laser generally has too broad of a linewidth to support the resonance enhancement for the technique of the present invention, and is therefore unsuitable. Without a narrow-linewidth pump laser source, such as an injection-seeded Nd: YAG laser, the cavity modes from the multi-mode laser will essentially spoil the etalon effect.

The technique of the present invention requires that the cavity length be adjusted in order to maintain resonance of all three waves (i.e., pump, signal and idler). The cavity length is adjusted by a closed-loop servo that senses the power of the output beam or the reduction of power in the rejected pump in order to maintain efficient conversion. The linewidth of this approach is self-narrowed, the exact value of which depends upon the values that make up the separate etalons at each wavelength. Tuning is limited only by the range over which the dichroic mirrors have uniform response, which is upwards of 100 nm or more.

In accordance with one implementation, cavity length adjustment is performed by mounting one of the end mirrors to a piezoelectric element and applying a suitable voltage to the piezoelectric element to cause expansion or contraction and corresponding movement of the mirror. Feedback indicating the cavity's performance is used to determine the appropriate voltage to apply to the piezoelectric element, thereby forming a closed-loop control system to adjust the cavity length. One mechanism for determining the cavity's performance is to evaluate the interference fringe pattern created by the pump beam. To prevent the pump beam from re-entering the optical cavity, the output pump beam is passed through an optical isolator. This arrangement essentially forms an interferometer in which the output of the optical isolator is a pattern of fringes created in the cavity. The cavity length can then be optimized by iteratively evaluating a null (i.e., a dark spot) in the fringe pattern and adjusting the cavity length accordingly.

Any of a variety of other mechanisms can be employed to adjust the length of the cavity to optimize OPO performance. For example, an electric field can be applied to the non-linear crystals to cause a change in length and a corresponding change in operation. Another approach involves driving wedges in and out of positions to cause an effect change in cavity length. Other, known cavity length adjustment techniques, such as those employed with injection-seeded pump lasers can also be used.

In accordance with another aspect of the present invention, a longer cavity length can be achieved while still maintaining a high energy output. The longer cavity length provides better output beam divergence properties. Normally, the length of the OPO optical cavity is inversely proportional to energy output, since a longer cavity results in fewer the round trips for the pulses within the optical cavity. Thus, cavity lengths are generally kept short to improve energy output at the expense of beam divergence. Due to the unique low-finesse, tri-etalon configuration of the OPO of the present invention, the cavity length can be nearly doubled while still maintaining 90–95% of the output energy produced at a shorter cavity length, giving rise to a higher beam quality without substantial loss of output energy. While this characteristic is highly advantageous, it will be understood that the tri-etalon OPO of the present invention is not required to be of any particular length or to have an extended length to take advantage of improved beam quality FIG. 2 illustrates operational performance of an experimental OPO designed in accordance with the principles of the present invention. At modestly high pump energy levels, an eye-safe 1.5 micron OPO achieves nearly 50% conversion efficiency from the pump to the signal wavelength and reduces the beam divergence by a factor of 2–3 over other more typical configurations. Additionally, the experimental OPO demonstrates that the linewidth narrows below the 50 pm resolution of the spectrometer used during experimentation.

While the embodiment shown in FIG. 1 involves the output idler beam emerging from same mirror as the pump beam and the output signal beam emerging from the opposite mirror, it will be understood that directions of the signal and idler beams can be reversed, with the output signal beam emerging from the same mirror as the pump beam and the output idler beam emerging from the opposite mirror.

The low-finesse tri-etalon OPO of the present invention has potential utility in a wide variety of applications. For example, the OPO of the present invention can be used to make narrow linewidth DIAL lidar measurements for species such as methane gas, water vapor, or other gasses. Another use of the OPO of the present invention is as an efficient source for mixing with laser harmonics to achieve good conversion to other wavelength regions such as ultraviolet, visible, or infrared. Further, the OPO can serve as a source for spectroscopy measurements from ultraviolet to infrared. Excitation of various physical properties of materials for identification can efficiently be performed with the OPO of the present invention. More generally, the OPO of the present invention can be used in the field of materials processing and in any basic scientific research requiring a narrow, tunable laser source. It will be understood that the present invention is not necessary limited to the optical parametric oscillator itself and may include such devices and systems which incorporate a low-finesse, tri-etalon OPO approach to generating an output at a particular wavelength.

Having described preferred embodiments of new and improved low-finesse, tri-etalon optical parametric oscillator, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A low-finesse optical parametric oscillator for generating optical outputs at a signal wavelength and an idler wavelength, comprising:
    an optical cavity comprising first and second coupling mirrors bounding said optical cavity, wherein the optical output at the signal wavelength is transmitted from one of the first and second coupling mirrors, and the optical output at the idler wavelength is transmitted from the other of the first and second coupling mirrors;
    a pump laser supplying pump energy to said optical cavity at a pump wavelength; and
    a non-linear optical medium disposed within said optical cavity and configured to convert energy at the pump wavelength to energy at the signal and idler wavelengths;
    wherein said first and second coupling mirrors have reflectivities which partially resonate energy at each of the pump, signal and idler wavelengths, thereby producing an etalon effect which enhances energy conversion efficiency from the pump wavelength to the signal and idler wavelengths.

2. The optical parametric oscillator of claim 1, wherein the pump energy initially enters said optical cavity through said first coupling mirror, and wherein a transmittance of said first coupling mirror is approximately 70% to 90% at the pump wavelength, and a transmittance of said second coupling mirror is approximately 0% to 30% at the pump wavelength.

3. The optical parametric oscillator of claim 1, wherein the transmittance of one of said first and second coupling mirrors is approximately 0% to 30% at the signal wavelength, and the transmittance of the other of said first and second coupling mirrors is approximately 70% to 90% at the signal wavelength.

4. The optical parametric oscillator of claim 1, wherein the transmittance of one of said first and second coupling mirrors is approximately 0% to 30% at the idler wavelength, and the transmittance of the other of said first and second coupling mirrors is approximately 70% to 90% at the idler wavelength.

5. The optical parametric oscillator of claim 1, wherein the transmittance of one of said first and second coupling mirrors is approximately 70% to 90% at the idler wavelength and approximately 0% to 30% at the signal wavelength, and the transmittance of the other of said first and second coupling mirrors is approximately 0% to 30% at the idler wavelength and approximately 70% to 90% at the signal wavelength.

6. The optical parametric oscillator of claim 1, wherein said optical parametric oscillator is a tri-etalon.

7. The optical parametric oscillator of claim 1, wherein, as a length of said optical cavity is increased, output beam divergence decreases without substantially decreasing output energy.

8. The optical parametric oscillator of claim 1, wherein said non-linear optical medium comprises walk-off compensated, non-linear optical crystals.

9. The optical parametric oscillator of claim 1, wherein said pump laser is an injection-seeded laser.

10. The optical parametric oscillator of claim 9, wherein said pump laser is an injection-seeded Nd: YAG laser.

11. The optical parametric oscillator of claim 1, where wavelengths of the optical outputs are tunable over a range of at least 100 nm.

12. The optical parametric oscillator of claim 1, wherein a length of said optical cavity is adjustable to maintain efficient energy conversion.

13. The optical parametric oscillator of claim 12, further comprising a cavity length adjustment system configured to adjust a length of said optical cavity in response to a measured output parameter indicative of an energy conversion efficiency of said optical parametric oscillator.

14. The optical parametric oscillator of claim 13, wherein said cavity length adjustment system evaluates a null of a fringe pattern created by pump energy escaping from said optical cavity.

15. The optical parametric oscillator of claim 13, wherein said cavity length adjustment system comprises a piezoelectric element configured to move one of said first and second coupling mirrors in response to the measured output parameter.

16. The optical parametric oscillator of claim 1, wherein the pump energy is a pulsed signal and the optical outputs at the signal and idler wavelengths are pulsed signals.

17. A method of generating a pulsed optical beam at an output wavelength, comprising:
   (a) introducing pulsed pump energy at a pump wavelength into an optical cavity bounded by first and second coupling mirrors;
   (b) passing the pulsed pump energy through a non-linear optical medium disposed within the optical cavity to convert the pulsed pump energy into pulsed energy at a signal wavelength and an idler wavelength, the output wavelength being one of the signal and idler wavelengths;
   (c) reflecting a portion of the pulsed energy at the output wavelength from the first and second coupling mirror into the optical cavity, such that the pulsed energy at the output wavelength is partially resonated within the cavity, thereby producing an etalon effect which enhances energy conversion efficiency from the pump wavelength to the output wavelength; and
   (d) output coupling the pulsed optical beam at the output wavelength emitted from one of the first and second coupling mirrors.

18. The method of claim 17, wherein (c) includes reflecting a portion of the energy at each of the pump, signal and idler wavelengths from the first and second coupling mirrors into the optical cavity, such that the energy at each of the pump, signal and idler wavelengths is partially resonated within the cavity.

19. The method of claim 18, wherein first and second optical beams are respectively generated at the signal and idler wavelengths, and wherein (d) includes:
   output coupling the first optical beam emitted from one of the first and second coupling mirrors, and output coupling the second optical beam from the other of the first and second coupling mirrors.

20. The method of claim 17, wherein (c) includes:
   reflecting approximately 70% to 100% of the pump energy at one of the first and second coupling mirrors and reflecting approximately 10% to 30% of the pump energy at the other of the first and second coupling mirrors.

21. The method of claim 17, wherein (c) includes:
   reflecting approximately 70% to 100% of the signal energy at one of the first and second coupling mirrors and reflecting approximately 10% to 30% of the signal energy at the other of the first and second coupling mirrors.

22. The method of claim 17, wherein (c) includes:
   reflecting approximately 70% to 100% of the idler energy at one of the first and second coupling mirrors and reflecting approximately 10% to 30% of the idler energy at the other of the first and second coupling mirrors.

23. The method of claim 17, wherein (c) includes:
   reflecting approximately 70% to 100% of the signal energy and approximately 10% to 30% of the idler energy at one of the first and second coupling mirrors and reflecting approximately 10% to 30% of the signal energy and approximately 70% to 100% of the idler energy at the other of the first and second coupling mirrors.

24. The method of claim 17, wherein (c) includes producing the etalon effect at all three of the pump, signal and idler wavelengths.

25. The method of claim 17, further comprising:
   (e) walk-off compensating the non-linear optical medium.

26. The method of claim 17, wherein (a) includes pumping the optical cavity with an injection-seeded Nd:YAG laser.

27. The method of claim 17, further comprising:
   (e) tuning the output wavelength over a range of at least 100 nm.

28. The method of claim 17, further comprising:
   (e) adjusting a length of the optical cavity to maintain efficient energy conversion.

29. A system for generating a pulsed optical beam at an output wavelength, comprising:
   an optical cavity comprising first and second coupling mirrors bounding said optical cavity, wherein the pulsed optical beam emerges from said optical cavity at one of said first and second coupling mirrors;
   a pump laser supplying pulsed pump energy to said optical cavity at a pump wavelength; and
   a non-linear optical medium disposed within said optical cavity and configured to convert pulsed energy at the pump wavelength to pulsed energy at the output wavelength;
   wherein said first and second coupling mirrors have reflectivities which partially resonate pulsed energy at the pump and output wavelengths, thereby producing an etalon effect which enhances energy conversion efficiency from the pump wavelength to the output wavelength.

30. The system of claim 29, wherein the pump energy initially enters said optical cavity through said first coupling mirror, and wherein a transmittance of said first coupling mirror is approximately 70% to 90% at the pump wavelength and a transmittance of said second coupling mirror is approximately 0% to 30% at the pump wavelength.

31. The system of claim 29, wherein the transmittance of one of said first and second coupling mirrors is approximately 70% to 90% at the output wavelength, and the transmittance of the other of said first and second coupling mirrors is approximately 0% to 30% at the output wavelength.

32. The system of claim 29, wherein:
   first and second optical beams are respectively generated at signal and idler wavelengths;
   a portion of the energy at each of the pump, signal and idler wavelengths is reflected from the first and second coupling mirrors into the optical cavity, such that the energy at each of the pump, signal and idler wavelengths is partially resonated within the cavity; and
   the first optical beam is emitted from one of the first and second coupling mirrors, and the second optical beam is emitted from the other of the first and second coupling mirrors.

33. The system of claim 32, wherein approximately 70% to 100% of the signal energy and approximately 10% to 30% of the idler energy is reflected at one of the first and second coupling mirrors, and approximately 10% to 30% of the signal energy and approximately 70% to 100% of the idler energy is reflected at the other of the first and second coupling mirrors.

34. A method of generating first and second optical beams at signal and idler wavelengths, comprising:

(a) introducing pump energy at a pump wavelength into an optical cavity bounded by first and second coupling mirrors;

(b) passing the pump energy through a non-linear optical medium disposed within the optical cavity to convert the pump energy into energy at the signal wavelength and the idler wavelength;

(c) reflecting a portion of the energy at each of the pump, signal and idler wavelengths from the first and second coupling mirror into the optical cavity, such that the energy at each of the pump, signal and idler wavelengths is partially resonated within the cavity, thereby producing an etalon effect which enhances energy conversion efficiency from the pump wavelength to the signal and idler wavelengths; and (d) output coupling the first optical beam emitted from one of the first and second coupling mirrors, and output coupling the second optical beam from the other of the first and second coupling mirrors.

35. A method of generating an optical beam at an output wavelength, comprising:

(a) introducing pump energy at a pump wavelength into an optical cavity bounded by first and second coupling mirrors;

(b) passing the pump energy through a non-linear optical medium disposed within the optical cavity to convert the pump energy into energy at a signal wavelength and an idler wavelength, the output wavelength being one of the signal and idler wavelengths;

(c) reflecting approximately 70% to 100% of the signal energy and approximately 10% to 30% of the idler energy at one of the first and second coupling mirrors and reflecting approximately 10% to 30% of the signal energy and approximately 70% to 100% of the idler energy at the other of the first and second coupling mirrors, such that the energy at the output wavelength is partially resonated within the cavity, thereby producing an etalon effect which enhances energy conversion efficiency from the pump wavelength to the output wavelength; and (d) output coupling the optical beam at the output wavelength emitted from one of the first and second coupling mirrors.

36. A system for respectively generating first and second optical beams at signal and idler wavelengths, comprising:

an optical cavity comprising first and second coupling mirrors bounding the optical cavity, wherein the first optical beam emerges from the optical cavity at one of the first and second coupling mirrors and the second optical beam emerges from the optical cavity at the other of the first and second coupling mirrors;

a pump laser supplying pump energy to the optical cavity at a pump wavelength; and a non-linear optical medium disposed within the optical cavity and configured to convert energy at the pump wavelength to energy at the signal and idler wavelengths;

wherein said first and second coupling mirrors have reflectivities which partially resonate energy at each of the pump, signal and idler wavelengths, thereby producing an etalon effect which enhances energy conversion efficiency from the pump wavelength to the signal and idler wavelengths.

37. The system of claim 36, wherein approximately 70% to 100% of the signal energy and approximately 10% to 30% of the idler energy is reflected at one of the first and second coupling mirrors, and approximately 10% to 30% of the signal energy and approximately 70% to 100% of the idler energy is reflected at the other of the first and second coupling mirrors.

* * * * *